June 30, 1964 J. C. HATHAWAY 3,139,606

CHARACTER RECOGNITION CIRCUIT USING MULTIAPERTURE CORES

Filed Nov. 1, 1961 4 Sheets-Sheet 1

INVENTOR.
JAMES C. HATHAWAY
BY Moody and Harris
ATTORNEYS

INVENTOR.
JAMES C. HATHAWAY
BY Moody and Harris
ATTORNEYS

June 30, 1964 J. C. HATHAWAY 3,139,606

CHARACTER RECOGNITION CIRCUIT USING MULTIAPERTURE CORES

Filed Nov. 1, 1961 4 Sheets-Sheet 3

INVENTOR.

JAMES C. HATHAWAY

BY Moody and Harris

ATTORNEYS

INVENTOR.
JAMES C. HATHAWAY
BY
Moody and Harris
ATTORNEYS

United States Patent Office 3,139,606 Patented June 30, 1964

3,139,606
CHARACTER RECOGNITION CIRCUIT USING MULTIAPERTURE CORES

James C. Hathaway, Corona del Mar, Calif., assignor to Collins Radio Company, Cedar Rapids, Iowa, a corporation of Iowa Filed Nov. 1, 1961, Ser. No. 149,247
6 Claims. (Cl. 340—146.2)

Figure 1:
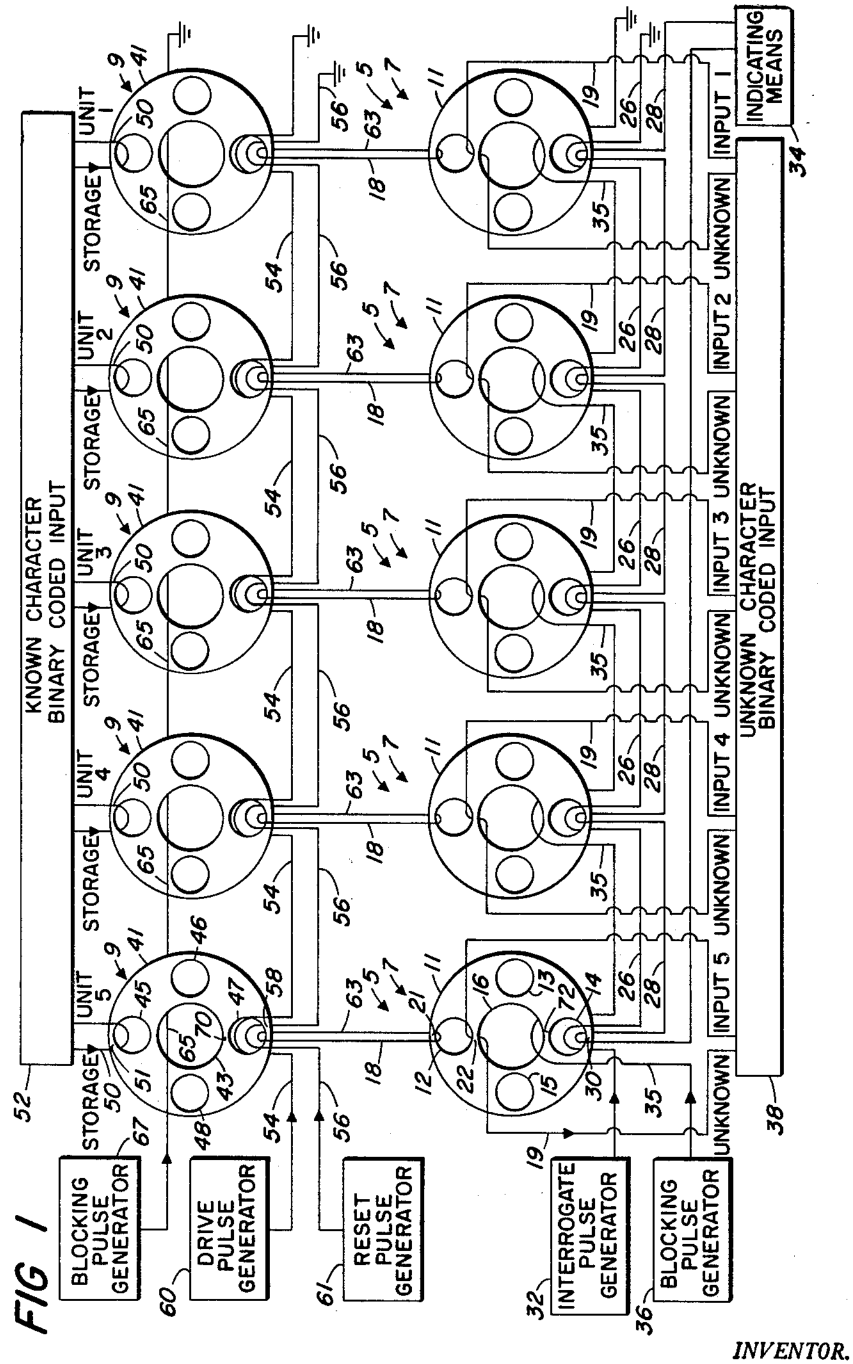

This invention pertains to a character recognition circuit using multiaperture cores and more particularly to a recognition circuit for comparing the bits of an unknown binary coded character with the corresponding bits of a known character to thereby quickly and automatically determine if they are identical.

As is well known in the art, a signal in binary form is most often used for information "processing" since such a signal is readily manifested by a current pulse or the absence of a pulse to represent two possible states. Customarily, and as used in this specification, a current pulse represents a ONE (or "1"), while the absence of a current pulse represents a ZERO or ("0").

It is oftentimes desirable to determine whether a binary coded character is of a particular value without having to decode the binary information. This invention provides a simple and practical, yet efficient and dependable, device for quickly and automatically determining whether a binary coded character represents a particular predetermined character without requiring translation from the binary code.

This invention features the use of a plurality of multiaperture cores part of which have windings thereon to form a plurality of exclusive "OR" circuits and another part of which have windings thereon to form an associated storage unit for each exclusive "OR" circuit with said unit providing nondestructive read-out of the stored information. As used herein, an exclusive "OR" circuit is one that receives a pair of input signals and provides an output signal only if the received input signals represent different binary states.

In view of the foregoing, it will be appreciated that if each bit of an unknown character is compared with a corresponding bit of a stored known character by means of an exclusive "OR" circuit and associated storage unit as taught by this invention, the identity of the unknown bit with respect to the stored known bit is readily established. Likewise, if an unknown character having $n$ bits is compared with a known character of $n$ bits by means of the system of this invention, the identity of the unknown character can be readily ascertained without translating the unknown from binary form.

By utilizing multiaperture cores in each storage unit, the bits representing the known character may be stored for repeated use, and hence the system of this invention also provides nondestructive read-out of the stored information so that any number of unknowns may be successively compared with the known character.

It is therefore an object of this invention to provide an improved character recognition circuit using multiaperture cores whereby an unknown character in binary form may be compared with a stored known character to establish the identity of the unknown character with respect to the known character without requiring decoding or translation of the unknown character from binary form.

It is another object of this invention to provide an improved character recognition system using multiaperture cores whereby any number of unknown characters may be successively compared with a stored known character to determine whether said unknown characters are the same as said known character.

It is a further object of this invention to provide $n$ exclusive "OR" circuits and $n$ magnetic storage cores whereby $n$ bits of binary coded information representing a known character may be nondestructively stored in said storage cores and each bit may be coupled to a different exclusive "OR" circuit prior to a bit corresponding in sequence to an unknown bit representing an unknown character of $n$ bits to thereby establish the identity of the unknown character with respect to the known character.

With these and other objects in view, which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

Figures 2A, 2B:
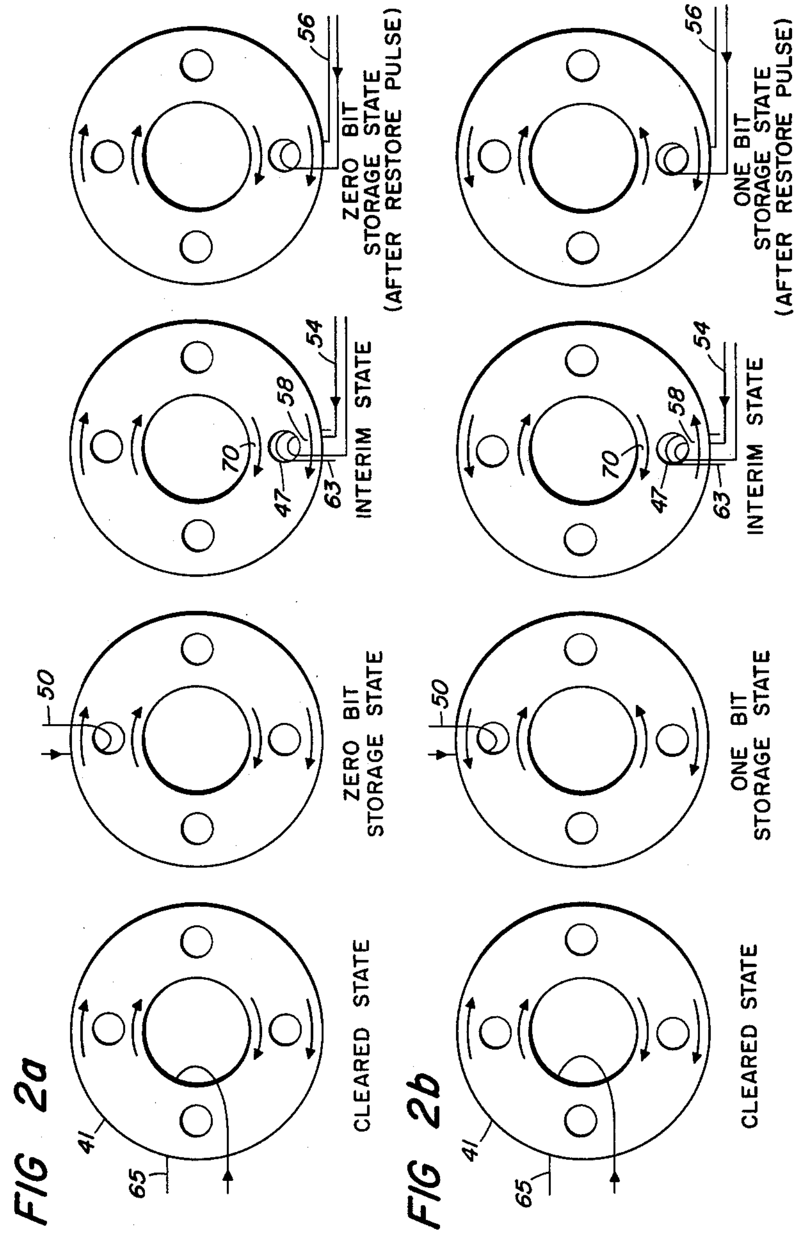
Figure 3A:
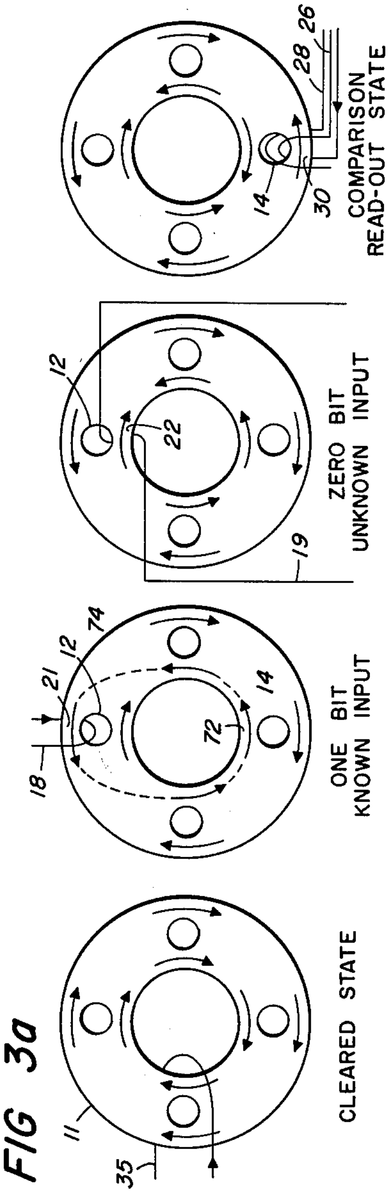
Figure 3B:
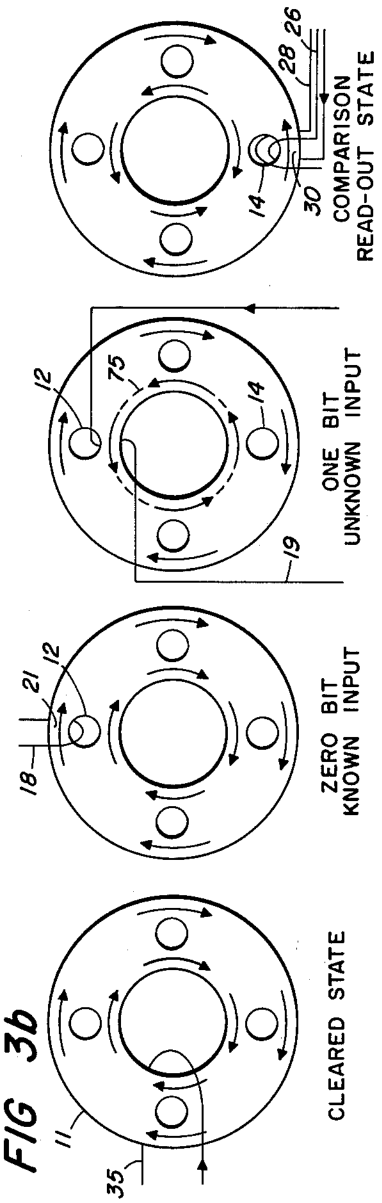
Figures 3C, 3D:
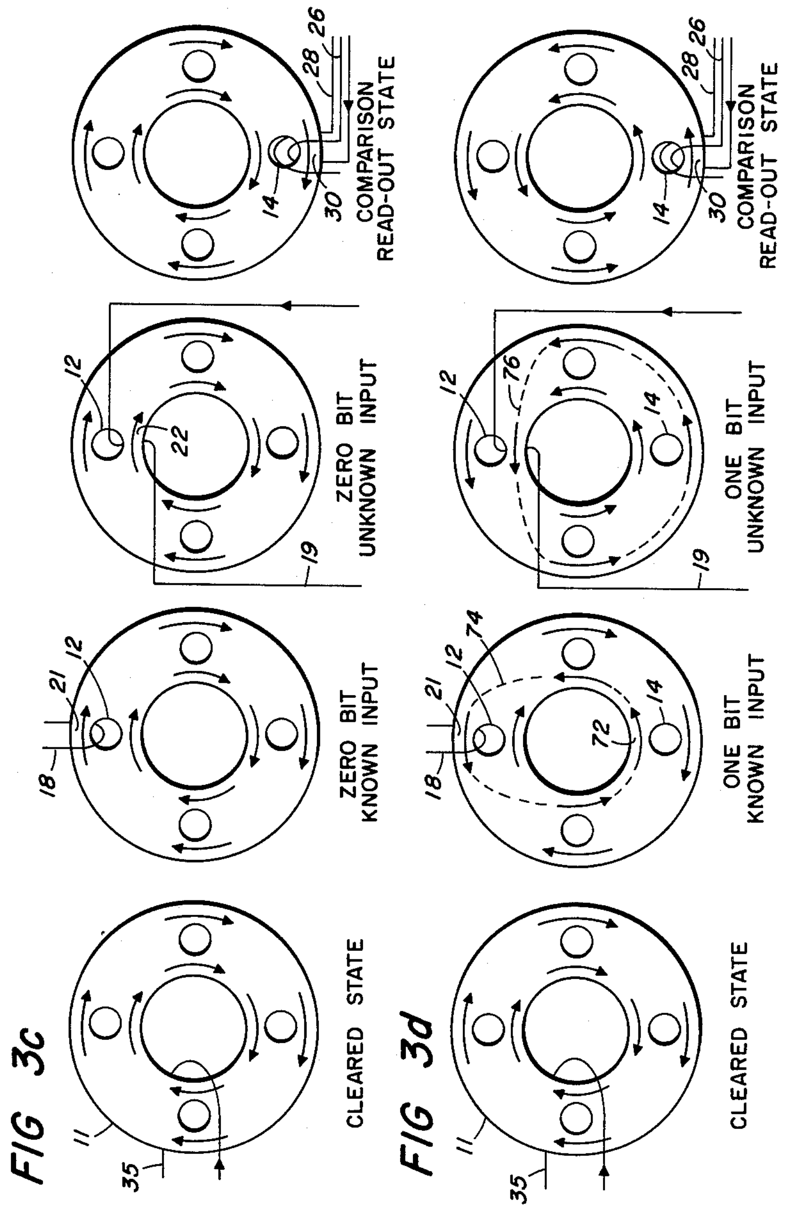

The accompanying drawings illustrate one complete example of the embodiment of the invention constructed according to the best mode so far devised for the practical application of the principles thereof, and wherein:

FIGURE 1 is a circuit diagram of the character recognition circuit of this invention;

FIGURES 2(*a*) and 2(*b*) illustrate the stages of a multiaperture core utilized for storage and nondestructive read-out; and FIGURES 3(*a*), 3(*b*), 3(*c*) and 3(*d*) illustrate the stages of a multiaperture core utilized as an exclusive "OR" circuit.

Referring now to the drawings, the numeral 5 represents generally a bit comparison device wherein one bit of an unknown binary coded character may be compared with a bit corresponding in sequence to a bit of a known binary character to establish identity, or lack of identity, between the two. As shown in FIGURE 1, each of the bit comparison devices includes an exclusive "OR" circuit 7 and a storage unit 9.

As shown in FIGURE 1, if the unknown character has five bits, then five bit comparison devices may be utilized. It is to be realized, however, that this invention is not meant to be limited to a system having five comparison devices, and that one bit comparison device is preferably provided for each bit of the unknown character so that an $n$ bit binary coded character requires $n$ bit comparison devices for concurrent recognition of all elements of the entire character.

Each exclusive "OR" circuit 7 may include a multiaperture core 11, which core may be a toroid having a rectangular hysteresis characteristic and may be made of ferrite material having four minor apertures 12, 13, 14 and 15 spaced around major aperture 16. The core itself may be conventional and may be a transfluxor type XF–3668 supplied by Radio Corporation of America, or an MAC type F–1023 supplied by General Ceramics.

Each multiaperture core 11 may have a pair of input windings 18 and 19 wound about legs 21 and 22, respectively, of minor aperture 12. In addition, each multiaperture core 11 may have an interrogate winding 26 and an output winding 28 wound about outer leg 30 of minor aperture 14. As shown in FIGURE 1, the interrogate windings 26 may be connected in series with one another and to a conventional interrogate pulse generator 32, while the ouput windings 28 may be connected in series with one another and to a conventional indicating means 34.

To initially magnetize core 11 of each exclusive "OR" circuit, a winding 35, passing through major aperture 16, may be provided, with all of the windings being connected in series with one another and to a conventional blocking pulse generator 36.

It has been found that for successful operation the blocking winding requires approximately 2.0 ampere-turns if either of the multiaperture cores listed herein is utilized, while the input windings require approximately 1.0 ampere-turn and the interrogate windings require approximately 0.4 to 1.0 ampere-turn depending upon the output load.

Each input winding 19 may be connected in parallel to an individual output of an unknown character binary coded input means 38, which means may be conventional and supplies one bit to each exclusive "OR" circuit so that each said core receives one unknown bit of the *n* bit character. As noted hereinabove, the bit so supplied is preferably a current pulse representing a ONE, or no pulse representing a ZERO.

Each storage unit 9 may include a multiaperture core 41, which core may be identical to each multiaperture core 11 and may have a major aperture 43 as well as four minor apertures 45, 46, 47 and 48. As shown in FIGURE 1, each multiaperture core 41 may have an input winding 50 wound on outer leg 51 of minor aperture 45, and input winding 50 may also be connected to a known character binary coded input means 52, which input means may be conventional and provides one known bit of a binary coded character to each storage core 41 in the same manner as described hereinabove with respect to the unknown character input means 38. The known bit supplied to each bit comparison device, must, of course, correspond in sequence to the unknown bit provided from unknown character input means 38 to avoid erroneous comparison.

A drive winding 54 and a reset winding 56 may be oppositely wound on outer leg 58 of minor aperture 47 of each core 41 so that the direction of induced flux from winding 54 is the opposite of that induced from winding 56. As shown in FIGURE 1, each of the drive and reset windings may be connected in series with one another and to a conventional drive pulse generator 60 and reset pulse generator 61, respectively.

An output winding 63 may also be wound on outer leg 58 of each storage core 41. In addition, each output winding 63 may be directly connected to input winding 18 of associated exclusive "OR" circuit 7.

Each core 41 may also have a blocking winding 65 passing through major aperture 43 with the windings being connected in series with one another and to a conventional blocking pulse generator 67.

It is to be appreciated, of course, that while the drive and reset windings 54 and 56 are shown and described herein to be connected in series with one another to thereby provide parallel application of character bits, a character may be read-in serially by modifying the shown structure to include gates to apply the individual bits sequentially to the proper input and at the same time gating the drive windings in a corresponding manner.

In operation, the bits representing a known character expressed in binary form are coupled to storage cores 41 from known character input means 52. Since a current pulse is to be coupled representing ONE and no pulse to represent ZERO, if the known character input in digital form equals the number 11, for example, the binary input as shown in the figure might be 01011 so that a current pulse would be coupled to three of the storage cores. If the sequence is from right to left, as shown in FIGURE 1, storage units 1, 2, and 4 will receive a current pulse, while units 3 and 5 will receive no pulse.

As shown in FIGURE 2(*a*) a clockwise flux flow is initially established in each core 41 by a pulse from blocking pulse generator 67 which energizes windings 65 to thereby saturate each core. Due to the remanent characteristic of each core 41, the legs of each will remain saturated after the blocking pulse is removed [as shown in FIGURE 2(*a*) in a clockwise direction] and the core is said to be in a blocked condition.

When the known character is then stored in cores 41, no pulse would be received in units 3 and 5 (if the number 11 in binary form is stored) from known character input means 52, and hence the direction of flux in each core is, of course, unchanged as shown in FIGURE 2(*a*).

As shown in FIGURE 2(*b*), however, the pulse coupled to units 1, 2, and 4 causes the outer leg of each to switch, that is, the direction of flux flow is reversed. As is known in the art, where the direction of flux flow was unchanged (as would be the condition of units 3 and 5), the core remains in a blocked condition, but where one leg has been switched (as would be the condition of units 1, 2 and 4), the core is in an unblocked condition after application of a pulse to input winding 50.

When an unknown character expressed in binary form is coupled from unknown character input means 38 to the exclusive "OR" circuits 7, the bits are applied in sequence from right to left to correspond with the stored bit information. If the unknown bit represents ONE, a current pulse will be coupled to energize winding 19 in each case, while if the bit represents ZERO, no current pulse will be coupled to energize winding 19. The current pulse may be applied to winding 19 at any time after drive pulse generator 60 couples a pulse to each storage unit.

As shown in FIGURES 2(*a*) and 2(*b*), and as known in the art, when drive winding 54 is energized, there will be a flux flow in legs 58 and 70 around minor aperture 47 only if the direction of remanent flux does not constitute a block. If the direction of remanent flux in legs 58 and 70 is the same [as shown in FIGURE 2(*a*)], then no current pulse is coupled from output winding 63 to input winding 18 since the core is blocked.

As shown in FIGURE 2(*b*), however, when the remanent flux does not constitute a block, that is, when the direction of remanent flux in legs 58 and 70 is in opposition, energization of drive winding 54 causes an output pulse to be coupled from output winding 63 to input winding 18 of exclusive "OR" circuit 7.

As shown in FIGURE 3, each exclusive "OR" circuit is "cleared" initially by a blocking pulse from blocking pulse generator 36 so that a clockwise remanent direction of flux is established. There are then four possibilities that can occur after both a known bit and an unknown bit have been coupled to an exclusive "OR" circuit since either bit can be a ONE while the other is a ZERO, both can be a ONE, or both can be a ZERO.

If the input to winding 18 (the stored known bit) should be a ONE (i.e., a current pulse is coupled thereto), while the input in winding 19 (the unknown bit) is a ZERO (i.e., no current pulse is coupled thereto), as shown in FIGURE 3(*a*), or if the input on winding 18 is a ZERO and the input on winding 19 is a ONE, as shown in FIGURE 3(*b*), the core will be unblocked with respect to output winding 28 on leg 30 of minor aperture 14. This is due to the flux path established when the legs 21 and 22 of minor aperture 12 are energized due to a ONE input on only one of the two input windings. The flux path includes leg 72 of minor aperture 14, as shown by dotted lines 74 and 75 of FIGURES 3(*a*) and 3(*b*), respectively, regardless of which input winding is energized to thereby reverse the direction of flux in leg 72 whenever the inputs are not of the same state.

However, if a ZERO is coupled to both windings 18 and 19, or if a ONE is coupled to both said windings, legs 30 and 72 will be blocked in either a clockwise or a counterclockwise direction. As shown in FIGURE 3(*c*), with no pulse coupled from either winding (representing a ZERO in each case) there, of course, can be no reversal of flux direction and hence the core is blocked in a clockwise direction, while, as shown in FIGURE 3(*d*), if a pulse is coupled to both windings (representing a ONE in each case), the flux is reversed in both legs 30 and 72 so that the core is blocked in a counterclockwise direction.

After each core 11 is in a comparison ready state, that is, after the stored and unknown bits have been applied to each exclusive "OR" circuit, a pulse may be sent through each winding 26 (on leg 30 of minor aperture 14) from interrogate pulse generator 32. If leg 72 of minor aperture 14 has been switched to unblock the core (i.e., the inputs were not of the same state), there will be a closed flux path about aperture 14 so that output winding 28 will be energized thereby. If, however, leg 72 has not been switched, or if both leg 72 and leg 30 have been switched, the core being blocked will prevent energization of output winding 28. The output, if any, from each exclusive "OR" circuit may then be coupled to indicating means 34 (or any other conventional utilizing device) to indicate that the unknown character is not identical to the known stored character. The indicating means may, of course, be gated off in conventional manner while pulses are being applied from unknown inputs to prevent false indications caused by flux being switched in leg 30.

After the comparison of inputs, a pulse through blocking pulse windings 35 clears the exclusive "OR" circuits and another unknown may be coupled thereto. The storage core, on the other hand, is in an interim state after the drive pulse is applied thereto [as shown by FIGURES 2(*a*) and 2(*b*)], and a pulse is sent through each winding 56 from reset pulse generator 61 to reset the storage core and enable it to again supply the stored bit information upon command and thus provide nondestructive readout. To erase the stored information, a pulse may be sent through each winding 65 from blocking pulse generator 67.

It should be evident from the foregoing to one skilled in the art that the character recognition circuit of the invention provides an improved means for character recognition using multiaperture cores.

What is claimed as my invention is:

1. A recognition system for $n$ bit binary coded characters, wherein each said bit is composed of a current pulse to represent one state and the absence of a current pulse to represent the opposite state, said system comprising: $n$ storage multiaperture cores having substantially rectangular hysteresis characteristics, each said core having a major aperture and a plurality of legs defining minor apertures; an input winding on one leg of each said storage core; a drive winding, a reset winding, and an output winding on a second leg of each said storage core; means connected to each said input winding for coupling an $n$ bit known character to said storage cores so that each core stores one said known bit; $n$ exclusive "OR" circuits each having a multiaperture magnetic comparison core associated with a separate said storage magnetic core, said cores having substantially rectangular hysteresis characteristics, a major aperture, and a plurality of legs defining minor apertures; first and second input windings on first and second legs of each said comparison core, each first input winding being connected to the output winding of said associated storage core; means connected to said second input windings for coupling $n$ bits of binary coded information representing an unknown character to said multiaperture comparison cores so that each comparison core receives said unknown bit corresponding to the stored known bit coupled from said associated storage core; means connected to said drive windings to cause each said known bit to be coupled to a different multiaperture comparison core; each said comparison core being blocked after receiving both said known and unknown bits if said bits are of the same state and unblocked if said bits are of the opposite state; means connected to said reset windings to reset each said storage core after read-out of said stored bits so that said stored information can be repeatedly utilized; an interrogate winding and an output winding on another leg of each said comparison core; and means for coupling a current pulse through said interrogate windings whereby an output pulse is produced at the output winding of each said multiaperture comparison core only if said core is unblocked.

2. A recognition system for $n$ bit binary coded characters wherein each said bit is composed of a current pulse to represent one state and the absence of a pulse to represent the opposite state, said system comprising: $n$ multiaperture storage cores each of which has a substantially rectangular hysteresis characteristic, a major aperture, and a plurality of legs defining spaced minor apertures; a blocking winding on each said storage core and passing through said major aperture for clearing and magnetizing said stored known character; an input winding on one leg of each said storage core; means for coupling $n$ bit binary coded information representing a known character to said input windings after said windings have been cleared so that one bit is coupled to each said storage core; an output winding on a second leg of each said storage core; a drive winding on said second leg of each said storage core for receiving a drive pulse to thereby cause the stored bit to be produced at the output winding of each said stored core; a reset winding on said second leg for receiving a reset pulse to thereby permit repeated reading of said stored bits; $n$ exclusive "OR" circuits each of which includes a multiaperture comparison core, each said core having a substantially rectangular hysteresis characteristic, a major aperture, and a plurality of legs defining spaced minor apertures; a blocking winding on each said comparison core passing through said major aperture for initially magnetizing each core; a first input winding wound on a first leg of one minor aperture of said comparison core; means connecting each output winding of said storage cores with one input winding of said comparison cores so that one stored bit is coupled to each said comparison core; a second input winding wound on a second leg of said one minor aperture of each said comparison core; means for coupling $n$ bit binary coded information representing an unknown character to said second input windings so that each said multiaperture comparison core receives said unknown bit corresponding to said stored known bit coupled thereto, said unknown bits being coupled to said comparison cores after said known bits have been coupled thereto; an output winding wound on a third leg of each said comparison core; and an interrogate winding wound on said third leg of each said comparison core for receiving a pulse to thereby cause an output pulse to be produced at each said output winding of said comparison cores only if the compared bits are dissimilar in state.

3. A recognition system for $n$ bit binary coded characters, wherein each said bit is composed of a current pulse to represent one state and the absence of a pulse to represent the opposite state, said system comprising: $n$ multiaperture cores having substantially rectangular hysteresis characteristics, each of said cores having a major aperture and a plurality of legs defining spaced minor apertures; a first winding on one leg of each said core for receiving one bit of an $n$ bit binary coded unknown character, each of said unknown bits being coupled to a different multiaperture core; $n$ saturable reactors having substantially rectangular hysteresis characteristics; said saturable reactors each having an input winding adapted to receive and store one bit of an $n$ bit binary coded known character so that each of said known bits is stored in a different saturable reactor, an output winding for coupling said stored known character bits from said saturable reactors, and a drive winding for controlling coupling of said bits from said saturable reactors; a second winding wound on a second leg of each said multiaperture core; means for connecting the output windings of said saturable reactors to said second windings on said multiaperture cores so that said known bits are coupled to each said multiaperture core receiving the sequentially corresponding unknown bit; an output winding wound on another leg of each said multiaperture core; and an interrogate winding wound on each said another leg for controlling recognition read-out whereby an output is produced at said output winding of each said multiaperture core only if said bits are dissimilar in state.

4. A recognition system for $n$ bit binary coded characters, wherein each said bit is composed of a current pulse to represent one state and the absence of a pulse to represent the opposite state, said system comprising: $n$ storage magnetic cores; input, drive, and output windings on each said storage core; means connected to each said input winding for coupling an $n$ bit known character to said storage cores so that each core stores one said known bit; $n$ exclusive "OR" circuits each having a multiaperture magnetic core associated with a separate said storage magnetic core, said cores having substantially rectangular hysteresis characteristics; first and second input, interrogate, and output windings on each said multiaperture core, each said first input winding being connected to the output winding on said associated storage core; means connected to said second input windings for coupling $n$ bits of binary coded information representing an unknown character to said multiaperture cores so that each multiaperture core receives said unknown bit corresponding to the stored known bit coupled from the associated storage core; means connected to said drive windings to cause each said known bit to be coupled to a multiaperture core; each said core being blocked after receipt of both said known bit and said unknown bit if said bits are of the opposite state; and means for generating a current pulse connected to said interrogate windings whereby an output pulse is produced at the output windings of each said multiaperture core only if said core is unblocked.

5. A recognition system for $n$ bit binary coded characters wherein a current pulse represents ONE and no pulse represents ZERO, said system comprising: $n$ multiaperture cores having substantially rectangular hysteresis characteristics; first input windings on each said core adapted to receive bit information representing an unknown character having $n$ bits so that one bit is coupled to each core with a current pulse indicating a ONE state and the absence of a pulse indicating a ZERO state; $n$ storage magnetic cores adapted to receive bit information representing a known character having $n$ bits so that one bit is coupled to each core with a current pulse being stored for a ONE state and the absence of a pulse indicating a ZERO state; winding means connecting each storage core with an associated multiaperture core so that the bits coupled to each multiaperture core will correspond in sequence; means connected to said storage cores to cause current pulses to be coupled to said multiaperture cores from said cores storing a ONE; each said core being blocked after receipt of said known and unknown bits if said received bits are both of the same state; an output winding on each said multiaperture core; an interrogate winding on each multiaperture core; and means for coupling a current pulse to said interrogate windings whereby no output pulse is produced at said output windings only if said cores are blocked.

6. In a recognition system for $n$ bit binary coded characters wherein each said bit is composed of a current pulse to represent one state and the absence of a current pulse to represent the opposite state, a bit comparison device, comprising: a first multiaperture core having a substantially rectangular hysteresis characteristic, a major aperture, and a plurality of legs defining spaced minor apertures; first and second input windings on first and second legs of said core; means for coupling an unknown bit to said first input winding; a second multiaperture core having a substantially rectangular hysteresis characteristic, a major aperture, and a plurality of legs defining spaced minor apertures; an input winding on one leg of said second multiaperture core; means for coupling a known bit to the input winding of said second multiaperture core so that said bit is stored therein; a drive winding and an output winding on a second leg of said second multiaperture core; means connecting said output winding on said second multiaperture core to said second input winding; means connected to said drive winding to cause said stored bit to be coupled to said multiaperture core; said multiaperture core being blocked if a received known bit and a received unknown bit are of the same state and unblocked if said received bits are of the opposite state; interrogate and output windings on another leg of said first multiaperture core; means connected to said interrogate winding for causing an output pulse to be produced at the output winding of said first multiaperture core only if said core is unblocked.

References Cited in the file of this patent

UNITED STATES PATENTS

| | | |
|---|---|---|
| 2,967,294 | Moerman | Jan. 3, 1961 |
| 2,997,692 | Lamy | Aug. 22, 1961 |
| 3,023,400 | Booth | Feb. 27, 1962 |
| 3,077,582 | Bauer | Feb. 12, 1963 |